United States Patent
Lv et al.

(10) Patent No.: US 9,979,875 B2
(45) Date of Patent: May 22, 2018

(54) FOCUSING FOR POINT LIGHT SOURCE SCENE

(71) Applicant: ZHEJIANG UNIVIEW TECHNOLOGIES CO., LTD, Zhejiang (CN)

(72) Inventors: Qiankun Lv, Zhejiang (CN); Ning Ren, Zhejiang (CN)

(73) Assignee: ZHEJIANG UNIVIEW TECHNOLOGIES CO., LTD, Zhejiang (CN)

( * ) Notice: Subject to any disclaimer, the term of this patent is extended or adjusted under 35 U.S.C. 154(b) by 0 days. days.

(21) Appl. No.: 15/115,018

(22) PCT Filed: Mar. 11, 2016

(86) PCT No.: PCT/CN2016/076113
§ 371 (c)(1),
(2) Date: Jul. 28, 2016

(87) PCT Pub. No.: WO2016/146021
PCT Pub. Date: Sep. 22, 2016

(65) Prior Publication Data
US 2017/0019582 A1    Jan. 19, 2017

(30) Foreign Application Priority Data
Mar. 16, 2015 (CN) .......................... 2015 1 0114236

(51) Int. Cl.
*H04N 5/232* (2006.01)
*H04N 5/235* (2006.01)

(52) U.S. Cl.
CPC ....... *H04N 5/23212* (2013.01); *H04N 5/2351* (2013.01)

(58) Field of Classification Search
CPC .................... H04N 5/23212; H04N 5/2351
See application file for complete search history.

(56) References Cited

U.S. PATENT DOCUMENTS

| 4,350,884 A | 9/1982 | Vollath |
| 6,937,284 B1 * | 8/2005 | Singh ................. H04N 5/23212 348/346 |

(Continued)

FOREIGN PATENT DOCUMENTS

| CN | 101339348 A | 1/2009 |
| CN | 101666957 A | 3/2010 |

(Continued)

OTHER PUBLICATIONS

Zhu et al., "Application of a new auto-focusing algorithm for precise height measurement in vision measuring machine", Computer Measurement & Control, Dec. 31, 2009, pp. Issue 9, vol. 17; ISSN: 1671-4598.

(Continued)

*Primary Examiner* — Gevell Selby
(74) *Attorney, Agent, or Firm* — Greenblum & Bernstein, P.L.C.

(57) ABSTRACT

A focusing method is disclosed, comprising: recording image statistical information corresponding to each position of a focusing lens from the beginning of focusing, wherein the image statistical information comprises a luminance value of image; determining whether the current scene is a point light source scene or not based on the recorded image statistical information; and executing a focusing process based on a regional luminance variance of image when the current scene is determined as a point light source scene. Wherein, the regional luminance variance of image denotes a mean of the square of differences between luminance values of a plurality of regions partitioned from an image and an average luminance value of the image. The method of the present disclosure can effectively improve the stability and accuracy of focusing effect under a point light source scene.

14 Claims, 6 Drawing Sheets

(56) References Cited

U.S. PATENT DOCUMENTS

| | | |
|---|---|---|
| 8,878,980 B2 | 11/2014 | Ohbuchi et al. |
| 2010/0123818 A1 | 5/2010 | Ono |
| 2011/0317935 A1* | 12/2011 | Anan .................. G06K 9/6278 382/274 |
| 2013/0107107 A1* | 5/2013 | Ohbuchi .................. G02B 7/38 348/349 |
| 2014/0300802 A1* | 10/2014 | Hamano ............ H04N 5/23212 348/354 |
| 2014/0313398 A1 | 10/2014 | Hamano |

FOREIGN PATENT DOCUMENTS

| | | |
|---|---|---|
| CN | 102967983 A | 3/2013 |
| CN | 103095983 A | 5/2013 |
| CN | 103354599 A | 10/2013 |
| CN | 104853087 A | 8/2015 |
| JP | H03-44608 A | 2/1991 |
| JP | 2004-294965 A | 10/2004 |
| JP | 2007-286474 A | 11/2007 |

OTHER PUBLICATIONS

Search Report issued in International Patent Application No. PCT/CN2016/076113, dated Jun. 1, 2016.

Office Action issued in EP family member Patent Appl. No. 16736752.3, dated Jan. 29, 2018.

* cited by examiner

FOCUSING FOR POINT LIGHT SOURCE SCENE

BACKGROUND

The present disclosure belongs to a field of video surveillance technology, and more particularly relates to focusing under a point light source scene.

Under a point light source scene, the traditional autofocus depending on image clarity evaluation may easily focus at a spurious crest of suspected peak, thereby leading to serious image blur.

Figure 1A:
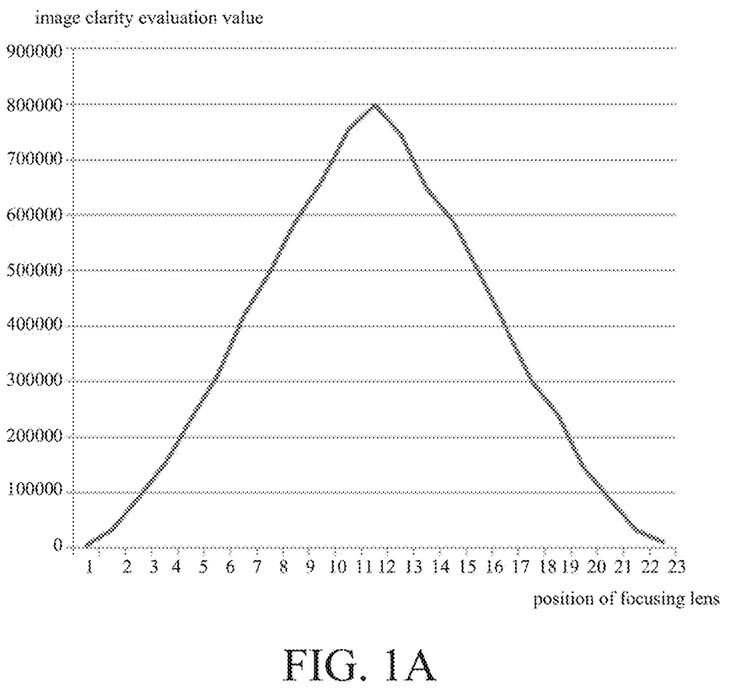
FIG. 1A is an image clarity evaluation curve under a normal scene.

More specifically, image clarity evaluation values may be acquired by using a clarity-evaluation-function, and the maximal image clarity evaluation value can be found by using some focusing search algorithms (e.g. the commonly used hill climbing search algorithm) based on the image clarity evaluation values, to determine the focus point position where the clearest image can be acquired. Under a normal focusing scene, with the focusing lens closing to or away from the focus point, the image clarity will monotonically increase or decrease, so that the image clarity evaluation curve demonstrates a better unimodality and the image clarity monotonically decreases on both sides of the peak value. For example, as shown in FIG. 1A, the horizontal axis denotes the position of the focusing lens and the vertical axis denotes the image clarity evaluation value. Under this condition, the optimum focus clarity point position can be determined by using the hill climbing search algorithm in combination with the appropriate search step and end conditions.

Figure 1B:
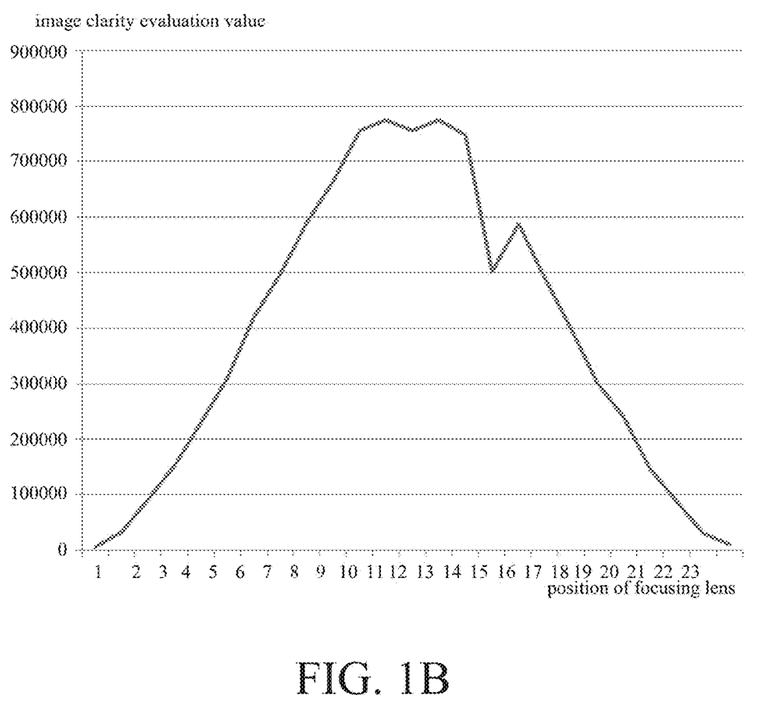
FIG. 1B is an image clarity evaluation curve under a point light source scene.

However, under a point light source scene, there may be spurious crest in the image clarity evaluation curve, for example, as shown in FIG. 1B, and may result in that the focusing search algorithm is trapped in a local extreme to lead to the defocus. Alternatively, under some point light source scenes, the image clarity evaluation curve may have the unimodality as shown in FIG. 1A, but there may be a deviation between the actual image clearest point position and the focus point position corresponding to the maximal image clarity evaluation value. Thus, searching for the focus point depending on the image clarity evaluation value, may easily search to a local extreme or lead to some repeat dither of the focusing effect, thereby affecting the accuracy and real-time of the focusing effect.

SUMMARY

The present disclosure provides a focusing method to improve the accuracy and stability of focusing under a point light source scene.

To achieve above objects, a focusing method is provided according to an aspect of the present disclosure, and may comprise:

recording image statistical information corresponding to each position of a focusing lens from the beginning of focusing, wherein the image statistical information may comprise a luminance value of image;

determining whether the current scene is a point light source scene or not based on the recorded image statistical information; and executing a focusing process based on a regional luminance variance of image when the current scene is determined as a point light source scene, wherein the regional luminance variance of image denotes a mean of the square of differences between luminance values of a plurality of regions partitioned from an image and an average luminance value of the image.

For the above focusing method, according to one embodiment, determining whether the current scene is a point light source scene or not based on the recorded image statistical information, may comprise:

comparing a current image luminance value with a minimum image luminance value, wherein the current image luminance value denotes a luminance value of an image corresponding to the current position of the focusing lens, and the minimum image luminance value denotes the minimum among luminance values of images respectively corresponding to positions of the focusing lens from the beginning of focusing; and preliminarily determining that the current scene is a point light source scene, if an absolute value of a difference between the current image luminance value and the minimum image luminance value is larger than a first threshold.

For the above focusing method, according to one embodiment, after preliminarily determining that the current scene is a point light source scene, the focusing method may further comprise:

partitioning an image corresponding to the current position of the focusing lens into N*M regions, wherein N and M are integers greater than or equal to 1 respectively; and determining whether the current scene is a point light source scene or not again based on luminance values of the N*M regions of the image corresponding to the current position of the focusing lens.

For the above focusing method, according to one embodiment, determining whether the current scene is a point light source scene or not again based on the luminance values of the N*M regions, may comprise:

selecting n suspected point light regions from the N*M regions in a descending order of the luminance values, wherein n is an integer greater than or equal to 1;

acquiring k luminance ratios for each of the suspected point light source regions by calculating a ratio of a luminance value of each of the suspected point light source regions with respect to a luminance value of each of k regions adjacent to the suspected point light source region, wherein k is an integer greater than or equal to 4;

determining that the current scene is a point light source scene, if there is at least one suspected point light source region for which two or more among the k luminance ratios are greater than a second threshold.

For the above focusing method, according to one embodiment, determining whether the current scene is a point light source scene or not again based on the luminance values of the N*M regions, may comprise:

determining whether the N*M regions comprise a high luminance region and a low luminance region, wherein the high luminance region is a region whose luminance value is greater than a high luminance threshold, and the low luminance region is a region whose luminance value is smaller than a low luminance threshold; and determining that the current scene is a point light source scene, if the N*M regions comprise both the high luminance region and the low luminance region.

For the above focusing method, according to one embodiment, determining whether the current scene is a point light source scene or not again based on the luminance values of the N*M regions, may comprise:

classifying the N*M regions into a high luminance ratio region, a medium luminance ratio region and a low luminance ratio region in accordance with a ratio of a luminance value of the brightest region within the N*M regions with respect to a luminance value of each of other regions within the N*M regions;

counting the number Nhigh of the high luminance ratio region, the number Nmedium of the medium luminance ratio region and the number Nlow of the low luminance ratio region;

determining that the current scene is a point light source scene, if the number Nhigh is greater than 0 and the number Mlow is smaller than a third threshold Ca; or determining that the current scene is a point light source scene, if the number Nhigh is equal to 0 and the number Nlow is greater than a fourth threshold Cb; or determining that the current scene is a point light source scene, if the number Nmedium is greater than a fifth threshold Cc and the number Nlow is smaller than the third threshold Ca.

For the above focusing method, according to one embodiment, executing the focusing process based on the regional luminance variance of image, may comprise:

recording image statistical information corresponding to each position of the focusing lens from the beginning of focusing, wherein the image statistical information may comprise a luminance value and the regional luminance variance of the image;

setting a search direction based on the recorded regional luminance variances;

setting a focus point based on the recorded regional luminance variances when the current scene is determined as a point light source scene based on the image statistical information corresponding to the current position of the focusing lens and a search termination condition has been satisfied; and setting a new position of the focusing lens along the set search direction and repeating the above process, when the current scene is determined as a point light source scene based on the image statistical information corresponding to the current position of the focusing lens but the search termination condition has not been satisfied yet.

For the above focusing method, according to one embodiment, setting the search direction based on the recorded regional luminance variances, may comprise:

determining the current changing trend of regional luminance variance based on the recorded regional luminance variances;

changing the search direction to a direction opposite to the current search direction, if the current changing trend of regional luminance variance is increasing and a difference of a regional luminance variance corresponding to the current position of the focusing lens with respect to a regional luminance variance corresponding to a previous position of the focusing lens exceeds a sixth threshold; and keeping the current search direction unchanged if the current changing trend of regional luminance variance is decreasing.

For the above focusing method, according to one embodiment, determining the current changing trend of regional luminance variance based on the recorded regional luminance variances, may comprise:

comparing the regional luminance variance corresponding to the current position of the focusing lens with the regional luminance variances corresponding to previous two positions of the focusing lens, if the regional luminance variances are decreased continuously, the current changing trend of regional luminance variance is decreasing, and if the regional luminance variances are increased continuously, the current changing trend of regional luminance variance is increasing.

For the above focusing method, according to one embodiment, the search termination condition may comprise any one of the following:

the search direction has been changed and the current changing trend of regional luminance variance is significantly increasing; and the current changing trend of regional luminance variance is significantly increasing and the changing trend of regional luminance variance was significantly decreasing.

For the above focusing method, according to one embodiment, setting the focus point based on the recorded regional luminance variances, may comprise: setting a position of the focusing lens corresponding the minimum of the recorded regional luminance variances to be a focus point of the focusing lens.

For the above focusing method, according to one embodiment, the focusing method may further comprise:

disabling exposure function before setting a first position of the focusing lens; and enabling the exposure function before setting the focus point based on the recorded regional luminance variances.

According to the focusing method provided in the present disclosure, a point light source scene may be identified during the focusing process based on the characteristics of the point light source scene, and the focus point under the point light source scene may be search out based on the regional luminance variances recorded during the focusing process. In this way, the accuracy and stability of focusing effect under a point light source scene may be effectively improved.

DETAILED DESCRIPTION OF THE EMBODIMENTS

The technical scheme of the present disclosure will be further illustrated in detail in combination with the accompanying drawings and embodiments hereinafter, and the following embodiments do not constitute the limitation to the present disclosure.

According to a focusing method provided by the embodiments of the present disclosure, firstly it may be determined whether the current scene is a point light source scene or not.

By collecting and analyzing an amount of experiment data, there are following characteristics of focusing under a point light source scene: an image may gradually blur with the focusing lens away from the focus point, and the dispersion of spot of the point light source may result in that the overall luminance of image significantly increases. It can be seen from the image luminance change curve shown in FIG. 3 that, the image luminance when the focusing lens deviates from the focus point position is significantly larger than that when the focusing lens is at the focus point position. Thus, it can be determined whether the current scene is a point light source scene or not, based on the above characteristics of a point light source scene.

Figure 2:
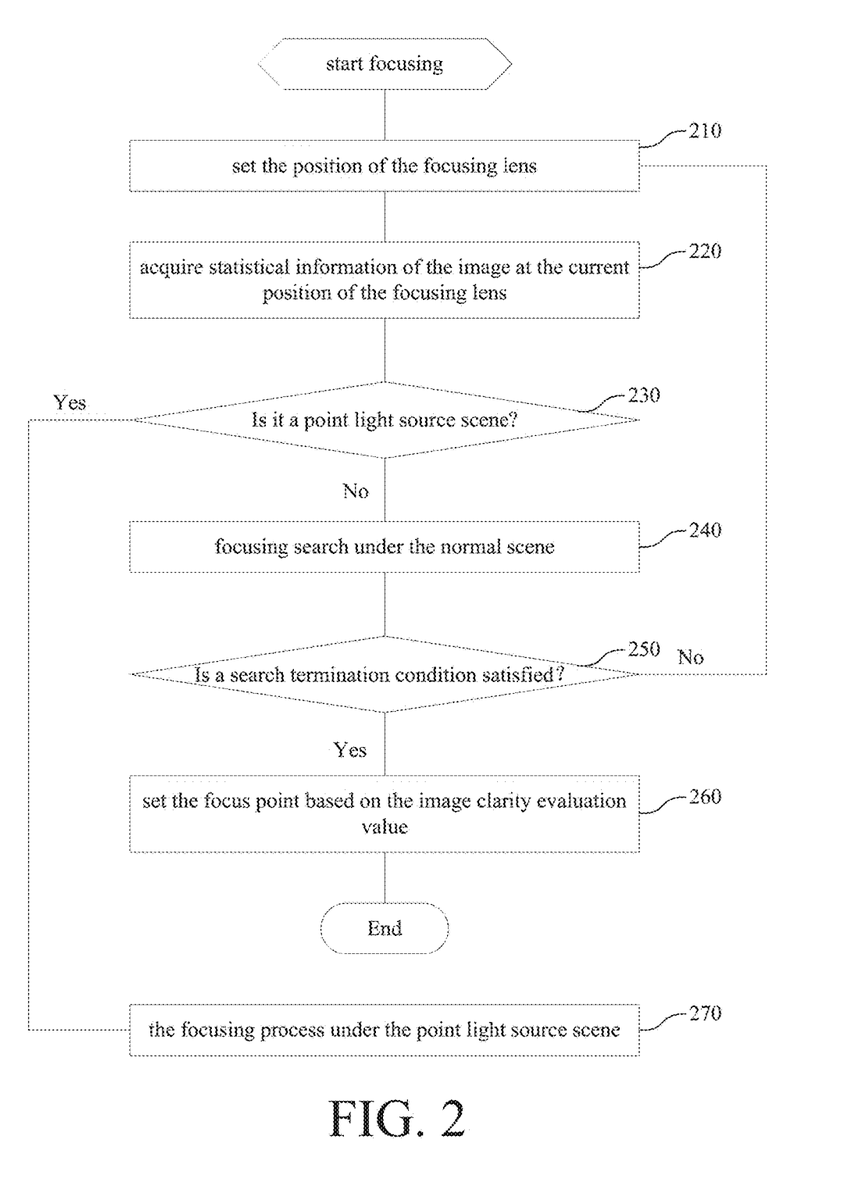
FIG. 2 is a schematic flow chart of a focusing method provided according to an example of the present disclosure.

According to a focusing method provided by the embodiments of the present disclosure, image luminance values corresponding to positions of the focusing lens during focusing may be recorded, and it can be determined whether the current scene is a point light source scene or not based on the recorded image luminance values. If it is determined that the current scene is a point light source scene, a focusing process under a point light source scene may be executed, and otherwise, a focusing process under a normal scene may be continued. As shown in FIG. 2, the focusing method may comprise steps 210-270.

Step 210: setting the position of the focusing lens.

In general, after starting focusing, a search direction and a moving step length of the focusing lens should be firstly confirmed, and then the positions of the focusing lens may be sequentially set in accordance with the search direction and the moving step length. Moreover, each time the position of the focusing lens is changed, statistical information may be calculated, for example, the image luminance value at each position of the focusing lens may be acquired.

Step 220: acquiring statistical information of an image at the current position of the focusing lens. Wherein the statistical information may comprise a luminance value of image and a clarity evaluation value of image and so on.

Step 230: determining whether the current scene is a point light source scene or not based on the statistical information of an image at each position of the focusing lens, and when it is determined to be Yes, the process proceeds to the step 270 to execute a focusing process under a point light source scene, otherwise the process proceeds to the step 240 to continue a focusing search under a normal scene.

Wherein for the determination as to whether the current scene is a point light source scene or not, for example, it can be performed according to whether the absolute value of the difference between the minimum among luminance values images at positions acquired from the beginning of focusing (hereinafter also refers to "a minimum image luminance value MinLuma") and a luminance value of an image at the current position of the focusing lens (hereinafter also refers to "a current image luminance value CurLuma") is greater than the set threshold ThresholdLuma or not. If the absolute value of the difference between the minimum image luminance value MinLuma and the current image luminance value CurLuma is greater than the set threshold ThresholdLuma, the current scene is determined as a suspected point light source scene.

In general, during focusing of common scenes, with the focusing lens closing to or away from the position of focus point, the exposure luminance value of the overall image will not be significantly changed. However, under a scene comprising a point light source, with the blur or clarity of a light source, the exposure luminance of the overall image will be significantly changed. Thus, when an image luminance change exceeds a certain threshold, it could be considered that the current scene is likely to be a suspected point light source scene.

After determining the current scene as a suspected point light source scene, the further point light source scene confirmation can be made, to eliminate the interference of non-point light source scenes such as a moving light source at night or a case where the scene itself is brighter and so on.

Figure 4:
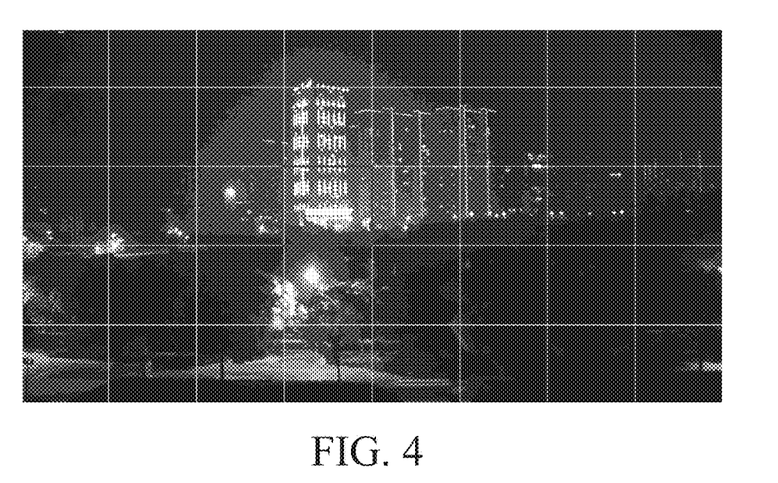
FIG. 4 schematically illustrates regional partition of an image under a point light source scene according to an example of the present disclosure.

For example, an image at the current position of the focusing lens may be partitioned into N*M regions, 5*8 regions as shown in FIG. 4, and it may be detected whether there is a point light source region or not, based on the luminance values of the regions. Wherein each region may be described as (i, j), for example, the region at the first row and the first column may be represented as the region (1, 1), the region at the first row and the second column may be represented as the region (1, 2), and so on. In general, the larger the amount of regions is, the larger the calculation amount is; while if the amount of regions is smaller, the luminance change among regions may not be significant, so that the point light source cannot be easily identified. Thou, the appropriate amount of regions is 35-45.

The specific implementation of confirmation for a point light source scene will be described b the following three embodiments.

Embodiment I: acquiring luminance values of the regions in an image at the current position of the focusing lens and selecting n suspected point light source regions in a descending order of the luminance values. Wherein n is the predetermined number of the suspected point light source regions, for example, n may be an integer greater than or equal to 1. Then, k luminance ratios for each of the suspected point light source regions may be acquired by calculating a ratio of a luminance value of each of the suspected point light source regions respectively with respect to a luminance value of each of k regions adjacent to the suspected point light source region. Wherein k is the number of the adjacent regions, for example k may be an integer greater than or equal to 4. Moreover, when k is equal to 4, it may denote that the four adjacent regions on the upper, lower, left and right sides of the suspected point light source region are selected; while when k is equal to 8, it may denote that the four adjacent regions on the upper left, lower left, upper right and lower right sides of the suspected point light source region are also selected. If there is a suspected point light source region for which two or more among the k luminance ratios are greater than the set adjacent region luminance threshold, the suspected point light source region could be considered to b a point light source region and the current scene is determined as a point light source scene.

Wherein when calculating the ratio of a luminance value of the suspected point light source region with respect to a luminance value of each adjacent region, the ratio may be acquired by dividing the luminance value of the suspected point light source region by the luminance value of the adjacent region. Of course, the ratio may be acquired by dividing the luminance value of the adjacent region by the luminance value of the suspected point light source region. These two ways bring the same technical effect and belong to the same technical means, and therefore, the repeated description will not be made hereinafter.

Assuming that the predetermined number of the suspected point light source regions is 2, the brightest region and the second brightest region found according to luminance values of regions, may be regarded as the suspected point light source regions. Assuming that the region (4, 3) is the suspected point light source region and the ratios of a luminance value of the suspected point light source region (4, 3) with respect to luminance values of the adjacent regions of the region (4, 3) are respectively Contrast_up, Contrast_down, Contrast_left, and Contrast_right, if there are more than two luminance ratios greater than the set adjacent region luminance ratio threshold ContrastThreshold, the suspected point light source region (4, 3) could be considered to be a point light source region, and thus the current scene may be determined as a point light source scene.

Embodiment II: determining whether there are simultaneously a high luminance region and a low luminance region in an image at the current position of the focusing lens or not, and if so, determining the current scene as a point light source scene.

Assuming that an image at the current position of the focusing lens is partitioned into 5*8 regions, the luminance threshold determination is performed for each region, and if there are simultaneously a high luminance region (for example, a region having luminance greater than a high luminance threshold HighLumaThreshold) and a low luminance region (for example, a region having luminance smaller than a low luminance threshold LowLumaThreshold), the current scene could be considered to be a point light source scene.

Embodiment III: classifying the regions in an image at the current position of the focusing lens into a high luminance ratio region, a medium luminance ratio region and a low luminance ratio region, based on a ratio of a luminance value of the brightest region in an image at the current position of the focusing lens with respect to a luminance value of each of all the other regions, and counting the number of each class of regions. If there are high luminance ratio regions and there are few low luminance ratio regions (e.g., the number of the low luminance ratio regions is smaller than a third threshold Ca), the current scene may be determined as a point light source scene. Alternatively, if there are no high luminance ratio regions and there are more low luminance ratio regions (e.g., the number of the low luminance ratio regions is greater than a fourth threshold Cb), the current scene may be determined as a point light source scene. Alternatively, if there are more medium luminance ratio regions (e.g., the number of the medium luminance ratio regions is greater than a fifth threshold Cc) and there are few low luminance ratio regions (e.g., the number of the low luminance ratio regions is smaller than the third threshold Ca), the current scene may be determined as a point light source scene.

Wherein when calculating a ratio of a luminance value of the brightest region with respect to a luminance value of each of all the other regions, if the luminance value of the brightest region is the numerator, a larger luminance ratio corresponds to the high luminance ratio region, a medium sized luminance ratio corresponds to the medium luminance ratio region, while a smaller luminance ratio corresponds to the low luminance ratio region. In contrast, if the luminance value of the brightest region is the denominator, a smaller luminance ratio corresponds to the high luminance ratio region, a medium sized luminance ratio corresponds to the medium luminance ratio region, while a larger luminance ratio corresponds to the low luminance ratio region. Thus, the high luminance ratio region may be considered to be a region with a sharp contrast between light and shade compared with the brightest region, the medium luminance ratio region may be considered to be a darker region compared with the brightest region, while the low luminance ratio region may be considered to be a region with the almost same luminance as the brightest region. For example, when the luminance value of the brightest region is the numerator, the region with a luminance ratio greater than 8 may be classified into the high luminance ratio region, the region with a luminance ratio between 2 to 8 may be classified into the medium luminance ratio region, and the region with a luminance ratio smaller than 2 may be classified into the low luminance ratio region. Then, it may be determined whether the current scene is a point light source scene or not, according to the number of each class of regions obtained by statistics.

For example, when an image corresponding to the current position of the focusing lens is partitioned into 5*8 regions, if the number of the high luminance ratio regions is greater than 0 and the number of the low luminance ratio regions is smaller than 4, it means that there is a sharp contrast between light and shade and or the current scene and there are fewer regions with the almost same luminance as the brightest region, and the current scene could be considered to be a point light source scene.

As another example, when an image corresponding to the current position of the focusing lens is partitioned into 5*8 regions, if the number of the high luminance ratio regions is equal to 0 and the number of the low luminance ratio regions is larger than 28, it means that the contrast between light and shade under the current scene is not obvious and there are more regions with the almost same luminance as the brightest region, and the current scene could be considered to be a point light source scene with more small point light sources.

As another example, when an image corresponding to the current position of the focusing lens is partitioned into 5*8 regions, if the number of the medium luminance ratio regions is greater than 15 and the number of the low luminance ratio regions is smaller than 4, it means that there are fewer regions with the almost same luminance as the brightest region under the current scene and all the other regions are darker compared with the brightest region, and the current scene could be considered to be a point light source scene with overall darkness at night and a smaller point light source region.

It should be noted that, the methods of the embodiment I and II may well identify the typical point light source scene, while the method of the embodiment III may well identify the point light source scene with overall darkness at night and a smaller point light source region or more small point light sources. The present disclosure is not limited to which method for confirming the point light source is used, and two methods may be simultaneously used to confirm the point light source. In addition, the sensitivity of the identification for the point light scene can be determined by a high luminance region threshold HighLumaThreshold, a low luminance region threshold LowLumaThreshold and an adjacent region luminance ratio threshold ContrastThreshold.

For a point light source scene, the existing clarity-evaluation-function may fail, and the auto-focus cannot be executed by the hill climbing search algorithm based on the clarity-evaluation-function. In addition, for a point light source scene, the clearer an image is, the lower the overall luminance value is, and due to the flat changing trend of the overall image luminance value near the clarity point, there is still somewhat blur when executing the auto-focus based on an image clarity evaluation value.

As shown in FIG. 2, from the beginning of focusing, corresponding image statistical information is acquired each time the position of the focusing lens is moved(step 220), and it is determined whether to be a point light source scene or not based on the acquired information (step 230). If it is determined that the current scene is a point light source scene at the current position of the focusing lens, the process proceeds to step 270 to skip to a focusing process under a point light source scene. However, if it is determined that the current scene is not a point light source scene, the process proceeds to step 240 to continue a focusing search under a normal scene, which may comprise: determining whether to satisfy a search termination condition (step 250), and when determined to satisfy the search termination condition, proceeding to step 260 to set the focus point based on an image clarity evaluation value (for example setting the position of the focusing lens corresponding to the maximal image clarity evaluation value to be the focus point), otherwise returning to the step 210 to repeat the above processing after updating the position of the focusing lens.

Wherein the search termination condition in the step 250 can be: the search direction has been changed and the changing trend of an image clarity evaluation value at the current position of the focusing lens is significantly decreasing; or the current changing trend of image clarity evaluation value is significantly decreasing and the changing trend of image clarity evaluation value was significantly increasing.

Figure 5:
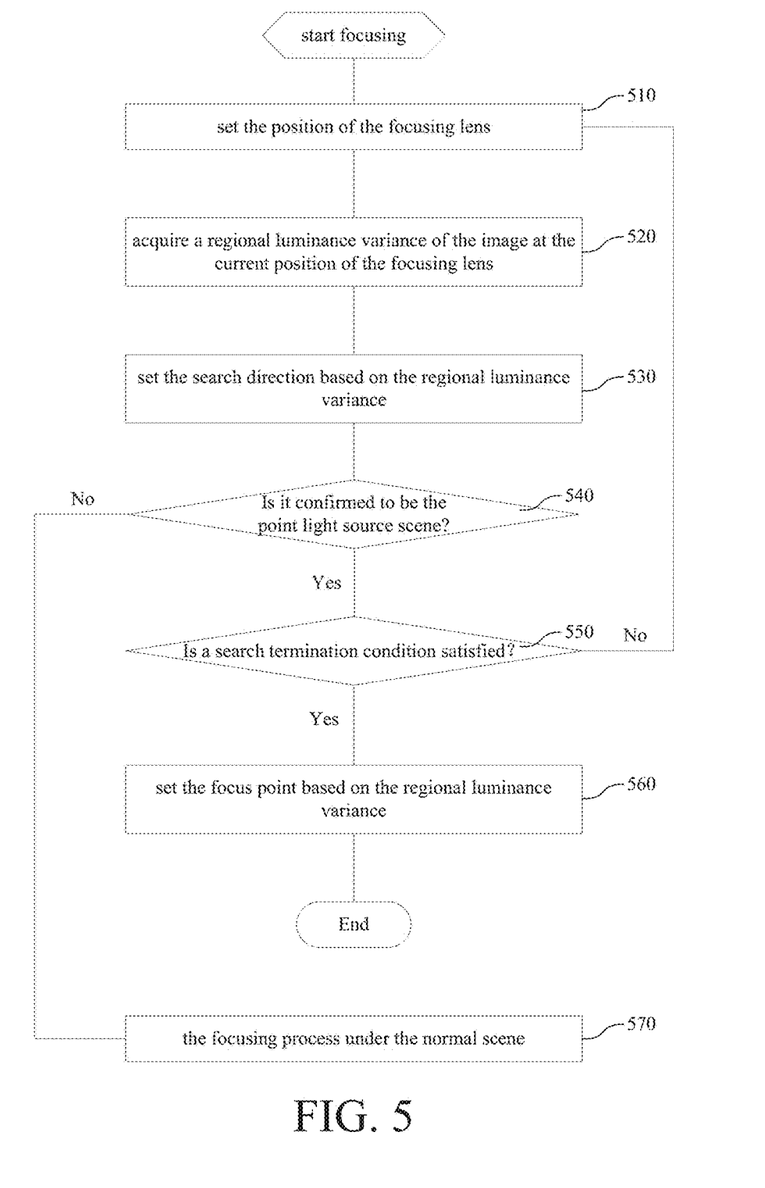
FIG. 5 is a schematic flow chart of a focusing method under a point light source scene provided according to an example of the present disclosure.

According to a focusing method provided by the embodiment of the present disclosure, after confirming that the current scene is a point light source scene, the auto-focus search based on a regional luminance variance can be executed. For example, a focusing process under a point light source scene is executed as shown in FIG. 5 and the focusing process may comprise the steps 510-590.

Step 510: setting the position of the focusing lens.

In general, after starting focusing, a search direction and a moving step length of the focusing lens should be firstly confirmed, then the positions of the focusing lens are set in accordance with the confirmed search direction and moving step length, and statistical information of an image at the current position of the focusing lens is acquired, which may comprise calculating a regional luminance variance of an image at the current position of the focusing lens.

Wherein the regional luminance variance refers to a mean of the square of difference between luminance values of a plurality of regions partitioned from an image and an average luminance value of the image. For example, when the image is partitioned into N*M regions as shown in FIG. 4, the regional luminance variance of the image can be calculated as follows:

$$D_{Luma}=E\{[\text{Luma}(i,j)-E(\text{Luma}(i,j))]^2\}$$

wherein Luma (i,j) denotes the luminance value in the region at the i-th row and the j-th column of the image, i is an integer greater than or equal to 1 and smaller than or equal to N, j is an integer greater than or equal to 1 and smaller than or equal to M; E(Luma(i,j)) denotes the luminance average value of all N*M regions, that is the average luminance value of the image; $E\{[(\text{Luma}(i,j)-E(\text{Luma}(i,j))]^2\}$ denotes a mean of the square of difference between luminance values of all regions and an average luminance value of the image.

Step 520: acquiring statistical information of an image at the current position of the focusing lens. Wherein the statistical information may comprise a luminance value of image and a regional luminance variance of image and so on.

Step 530: setting a search direction based on the recorded regional luminance variance of an image at each position of the focusing lens.

For example, it can be determined whether the changing trend of regional luminance variance of an image at the current position of the focusing lens is decreasing or not. If the current changing trend of regional luminance variance is increasing, and a difference of a regional luminance variance corresponding to the current position of the focusing lens with respect to a regional luminance variance corresponding to a previous position of the focusing lens, exceeds the set threshold, it is considered that a search direction may need to be changed and the search direction is set as a direction opposite to the current search direction. In addition, if the current changing trend of regional luminance variance is decreasing, the search in the current direction can be continued, i.e., the current search direction remains unchanged.

Figure 3:
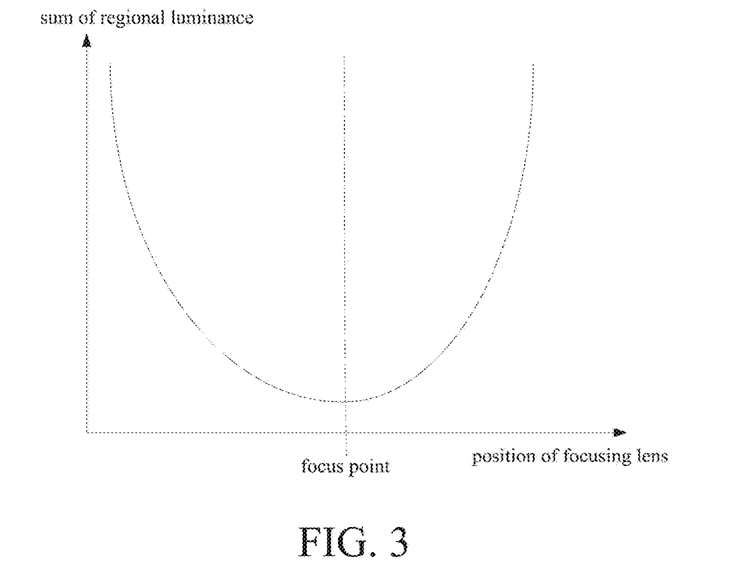
FIG. 3 is an image luminance change curve under a point light source scene.

When determining the changing trend of regional luminance variance of an image at the current position of the focusing lens, the changing trend of regional luminance variance of an image may be similar to the changing trend of image luminance shown in FIG. 3. The regional luminance variance of the image at each position of the focusing lens is recorded, and the regional luminance variance of an image at the current position of the focusing lens is compared with the regional luminance variances of the image at previous two positions of the focusing lens. If the regional luminance variances are decreased continuously, it could be considered that the changing trend of regional luminance variance is decreasing; while if the regional luminance variances are increased continuously, it could be considered that the changing trend of regional luminance variance is increasing. It can be known that the regional luminance variance of an image at the current position of the focusing lens trends to decrease or increase, by comparing the regional luminance variance of an image corresponding to the current position of the focusing lens with the regional luminance variances of the image corresponding to previous two positions of the focusing lens. If the trend is increasing and the changing value exceeds a certain threshold, it can be considered that the current search direction is away from the focus point and the search direction needs to be changed. If the trend is decreasing, it can be considered that the current search direction is closed to the focus point and the movement in this direction can be continued.

Wherein the difference of a regional luminance variance corresponding to the current position of the focusing lens with respect to a regional luminance variance corresponding to a previous position of the focusing lens, can be a difference between the regional luminance variance corresponding to the current position of the focusing lens and any regional luminance variance corresponding to a previous position of the focusing lens. For example, the difference can be acquired by comparing the current position of the focusing lens with anyone of the previous two positions of the focusing lens, and the determination is made by setting an appropriate threshold, which are not limited in the present disclosure.

Step 540: determining the current scene is a point light source scene based on an image at the current position of the focusing lens. If the current scene is confirmed be a point light source scene, the process proceeds to step 550 to continue a focusing process under a point light source scene, otherwise the process proceeds to step 570 to quit the focusing process under a point light source scene and skip to a focusing process under a normal scene.

When a point light source scene is identified as shown in the step 230 in FIG. 2, a non-point light source scene with somewhat blur may be erroneously determined to be a point light source scene. However, with the focusing lens closing to the focus point, the increasing of the clarity of image may relieve the misjudgment. In addition, the existence of a moving light source may also result in the misjudgment of a point light source scene. For example, if a vehicle enters the current scene at night, a moving light source like a vehicle lamp may cause interference, and may result in that a non-point source scene is erroneously determined to be a point light source scene. Thus, the confirmation of point light source scene can be executed during the focusing process of point light source, to eliminate a previous misjudgment as much as possible. If the current scene is confirmed to be a point light source scene, the process proceeds to step 550 to continue a focusing process under a point light source scene, while if the current scene is determined as a non-point light source scene, the process skips to a normal focusing process, for example, a focusing search based on an image clarity evaluation value is performed.

Step 550: determining whether to satisfy a search termination condition or not. If determining that the search termination condition is satisfied, the process proceeds to step 560 to quit the search, and a focus point is set based on a regional luminance variance of an image corresponding to each position of the focusing lens, for example the focus point can be set at the position of the focusing lens corresponding to the minimum regional luminance variance. While if determining that the search termination condition is not satisfied, the process returns to the step 510 to update the position of the focusing lens and repeat the above process.

Wherein the search termination condition can be: the search direction has been changed and the changing trend of regional luminance variance of an image at the current position of the focusing lens is significantly increasing, or the current changing trend of regional luminance variance is significantly increasing and the changing trend of regional luminance variance was significantly decreasing. It can be determined whether the changing trend is significant or not according to the number of times of continuous increasing or decreasing of regional luminance variances. For example, if the regional luminance variances are continuously increased many times, it could be considered that the changing trend of regional luminance variance is significantly increasing; while if the regional luminance variances are continuously decreased many times, it could be considered that the changing trend of regional luminance variance is significantly decreasing. Alternatively, it can be determined whether the changing trend is significant or not according to whether the changing value of regional luminance variance exceeds a certain threshold or not. For example, if the increasing amount of a regional luminance variance corresponding to the current position of the focusing lens with respect to a regional luminance variance corresponding to the previous one position of the focusing lens exceeds a certain threshold, it could be considered that the changing trend of regional luminance variance is significantly increasing; while if the decreasing amount of a regional luminance variance corresponding to the current position of the focusing lens with respect to a regional luminance variance corresponding to the previous one position of the focusing lens exceeds a certain threshold, it could be considered that the changing trend of regional luminance variance is significantly decreasing.

In addition, an exposure function can be disabled during focusing, and the exposure function can be enabled in after determining that a search termination condition is satisfied, to avoid that the final sensitivity of focusing is affected by the luminance change due to exposure. More specifically, during focusing of a point light source scene, due to the significant changing trend of luminance, the auto exposure (AE) algorithm may lower a luminance when an image becomes bright, to make the changing trend of luminance tend to be flat. Obviously, this will affect the determination of a point light source scene and regional luminance information which focusing depends on, thereby affecting the final sensitivity of focusing.

It should be noted that, although the step 530 is executed before the steps 540 and 550 as shown in FIG. 5, those skilled in the art shall appreciate that the present disclosure is not limited to this. In fact, the step 530 can be executed after the step 540 or the step 550, even can be simultaneously executed with the step 540 or the step 550, as long as the setting of focusing search direction is completed before it is determined as No in the step 550 thereby returning to the step 510 to update the position of the focusing lens.

For example, the process may, after acquiring statistical information of an image at the current position of the focusing lens (step 520), proceed to the step 540 to confirm whether the current scene is a point light source scene, and if the current scene is confirmed to be a point light source scene, the process proceeds to step 530 to set the search direction based on the regional luminance variance of an image at each position of the focusing lens, otherwise the process proceeds to the step 570 to quit a focusing process under a point light source scene and skip to a focusing process under a normal scene. Moreover, after completing the setting of search direction in the step 530, the process proceeds to the step 550 to determine whether a focusing search termination condition under a point light source scene is satisfied or not, and the process returns to the step 510 when determining not to satisfy the search termination condition, to set a new position of the focusing lens in accordance with the current search direction and continue the focusing process under a point light source scene.

As another example, the process may, after acquiring statistical information of an image at the current position of the focusing lens (step 520), proceed to the step 540 to confirm whether the current scene is a point light source scene or not, and if the current scene is confirmed to be a point light source scene, the process proceeds to the step 550 to determine whether a focusing search termination condition under a point light source scene is satisfied or not, otherwise the process proceeds to the step 570 to quit the focusing process under a point light source scene and skip to a focusing process under a normal scene. If determining not to satisfy the search termination condition in the step 550, the process proceeds to the step 530 to set the search direction based on the regional luminance variance of an image at each position of the focusing lens. Moreover, the process returns to the step 510 after completing the setting of search direction in the step 530, to set a new position of the focusing lens in accordance with the current search direction and thus continue the focusing process under a point light source scene.

Figure 6:
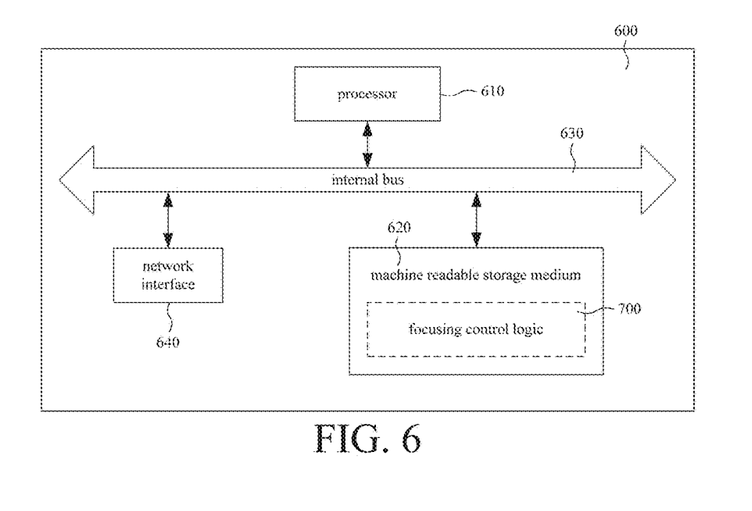
FIG. 6 schematically illustrates a hardware structure of a focusing device according to an example of the disclosure.

Referring to FIG. 6, the disclosure also provides a focusing device corresponding to the above method. As shown in FIG. 6, the focusing device 600 may comprise a processor 610 and a machine readable storage medium 620, wherein the processor 610 and the machine readable storage medium 620 are typically interconnected via an internal bus 630. In other possible implementations, the focusing device may also comprise an external interface 640 to enable communication with other devices or components.

In different examples, the machine readable storage medium 620 may be: RAM (Random Access Memory), volatile memory, nonvolatile memory, flash memory, storage drive (such as hard disk drive), solid state hard disk, any kind of storage disk (such as optical disk, DVD etc. similar storage medium, or a combination thereof.

Figure 7:
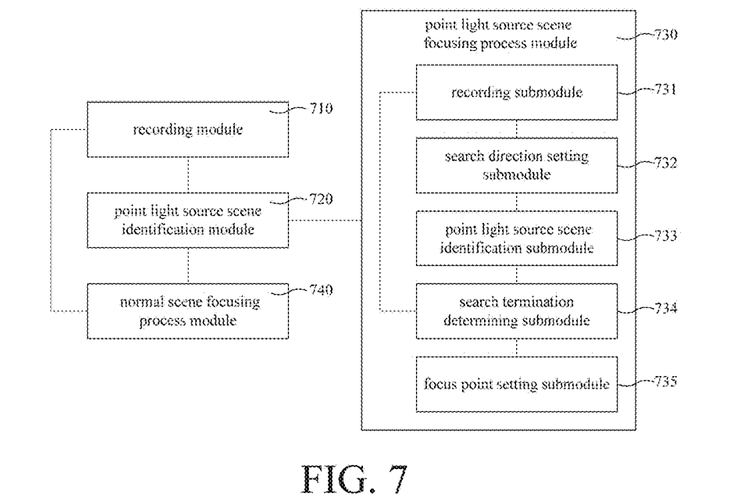
FIG. 7 schematically illustrates functional modules of focusing control logic corresponding to the focusing methods shown in FIG. 2 and FIG. 5.

Further, the machine readable storage medium 620 may store machine-executable commands corresponding to focusing control logic 700. From a perspective of functional division, the focusing control logic 700 may comprise:

a recording module 710, used to record image statistical information corresponding to each position of a focusing lens from the beginning of focusing, wherein the image statistical information may comprise a luminance value of image;

a point light source scene identification module 720, used to determine whether the current scene is the a light source scene based on the recorded image statistical information;

a point light source scene focusing process module 730, used to execute a focusing process based on a regional luminance variance of image when the point light source scene identification module 720 determines that the current scene is a point light source scene, wherein the regional luminance variance of image denotes a mean of the square of differences between luminance values of a plurality of regions partitioned from an image and an average luminance value of the image; and a normal scene focusing process module 740, used to execute a focusing process based on an image clarity evaluation value when the point light source scene identification module 720 determines that the current scene is not a point light source scene.

According to one example, the point light source scene identification module 720 is configured to perform the following operations:

comparing a current image luminance value with a minimum image luminance value, wherein the current image luminance value denotes a luminance value of an image corresponding to the current position of the focusing lens, and the minimum image luminance value denotes the minimum among luminance values of images respectively corresponding to positions of the focusing lens from the beginning of focusing; and preliminarily determining that the current scene is a point light source scene, if an absolute value of a difference between the current image luminance value and the minimum image luminance value is larger than a first threshold.

According to one example, the point light source scene identification module 720 is also configured to, after preliminarily determining that the current scene is a point light source scene, perform the following operations:

partitioning an image corresponding to the current position of the focusing lens into N*M regions, wherein N and M are integers greater than or equal to 1 respectively; and determining whether the current scene is a point light source scene or not again based on luminance values of the N*M regions.

According to one example, the point light source scene identification module 720 is also configured to, when determining whether the current scene is a point light source scene or not again based on the luminance values of the N*M regions, perform the following operations specifically:

selecting n suspected point light regions from the N*M regions in a descending order of the luminance values, wherein n is an integer greater than or equal to 1;

acquiring k luminance ratios for each of the suspected point light source regions by calculating a ratio of a luminance value of each of the suspected point light source regions with respect to a luminance value of each of k regions adjacent to the suspected point light source region, wherein k is an integer greater than or equal to 4;

determining that the current scene is a point light source scene, if there is at least one suspected point light source region for which two or more among the k luminance ratios are greater than a second threshold.

According to another example the point light source scene identification module 720 is also configured to, when determining whether the current scene is a point light source scene or not again based on the luminance values of the N*M regions, perform the following operations specifically:

determining whether the N*M regions comprise a high luminance region and a low luminance region, wherein the high luminance region is a region whose luminance value is greater than a high luminance threshold, and the low luminance region is a region whose luminance value is smaller than a low luminance threshold; and determining that the current scene is a point light source scene, if the N*M regions comprise both the high luminance region and the low luminance region.

According to another example, the point light source scene identification module 720 is also configured to, when determining whether the current scene is a point light source scene or not again based on the luminance values of the N*M regions, perform the following operations specifically:

classifying the N*M regions into a high luminance ratio region, a medium luminance ratio region and a low luminance ratio region, in accordance with a ratio of a luminance value of the brightest region within the N*M regions with respect to a luminance value of each of other regions within the N*M regions;

counting the number Nhigh of the high luminance ratio region, the number Nmedium of the medium luminance ratio region and the number Nlow of the low luminance ratio region;

determining that the current scene is a point light source scene, if the number Nhigh is greater than 0 and the number Nlow is smaller than a third threshold Ca; or determining that the current scene is a point light source scene, if the number Nhigh is equal to 0 and the number Nlow is greater than a fourth threshold Cb; or determining that the current scene is a point light source scene, if the number Nmedium is greater than a fifth threshold Cc and the number Nlow is smaller than the third threshold Ca.

According to one example, the point light source scene focusing process module 730 may comprise:

a recording submodule 731, used to record image statistical information corresponding to each position of the focusing lens from the beginning of focusing, wherein the image statistical information may comprise a luminance value and the regional luminance variance of the image;

a search direction setting submodule 732, used to set a search direction based on the recorded regional luminance variances;

a point light source scene confirmation submodule 733, used to determine whether the current scene is a point light source scene or not based on the image statistical information corresponding to the current position of the focusing lens;

a search termination determining submodule 734, used to determine whether a search termination condition is satisfied or not; and a focus point setting submodule 735, used to set a focus point based on the recorded regional luminance variances, when the point light source scene confirmation submodule 733 determines that the current scene is a point light source scene and the search termination determining submodule 734 determines that the search termination condition has been satisfied, moreover, when the point light source scene confirmation submodule 733 determines that the current scene is a point light source scene and the search termination determining submodule 734 determines that the search termination condition has not been satisfied, the point light source scene focusing process module 730 sets a new position of the focusing lens along the search direction set by the search direction setting submodule 732, and the recording submodule 731 is entered.

According to one example, the search direction setting submodule 732 is configured to:

determine the current changing trend of regional luminance variance based on the recorded regional luminance variances;

change the search direction to a direction opposite to the current search direction, if the current changing trend of regional luminance variance is increasing and a difference of a regional luminance variance corresponding to the current position of the focusing lens with respect to a regional luminance variance corresponding to a previous position of the focusing lens exceeds a sixth threshold, and keep the current search direction unchanged if the current changing trend of regional luminance variance is decreasing.

According to one example, the search direction setting submodule 732 is also configured to, when determining the current changing trend of regional luminance variance based on the recorded regional luminance variances, perform the following operations specifically:

comparing the regional luminance variance corresponding to the current position of the focusing lens with the regional luminance variances corresponding to previous two positions of the focusing lens, if the regional luminance variances are decreased continuously, the current changing trend of regional luminance variance is decreasing, and if the regional luminance variances are increased continously, the current changing trend of regional luminance variance is increasing.

According to one example, the search termination condition may comprise any one of the following: the search direction has been changed and the current changing trend of regional luminance variance is significantly increasing; and the current changing trend of regional luminance variance is significantly increasing and the changing trend of regional luminance variance was significantly decreasing.

According to one example, the focus point setting submodule 735 is configured to set a position of the focusing lens corresponding to the minimum of the recorded regional luminance variances to be a focus point of the focusing lens.

According to one example, the point light source scene focusing process module 730 also comprises an exposure control submodule, the exposure control submodule is configured to:

disable exposure function before setting a first position of the focusing lens; and enable the exposure function before the focus point setting submodule 735 sets the focus point based on the recorded regional luminance variances.

A software implementation will be described below as an example to further illustrate how the focusing device 600 performs the focusing control logic 700. In this example, the focusing control logic 700 of the disclosure may be construed as machine-executable commands stored in the machine readable storage medium 620. When the processor 610 on the focusing device 600 of the disclosure performs the focusing control logic 700, the processor 610 performs, by calling the machine-executable commands corresponding to the focusing control logic 700 saved on the machine readable storage medium 620, the following operations:

recording image statistical information corresponding to each position of a focusing lens from the beginning of focusing, wherein the image statistical information may comprise a luminance value of image;

determining whether the current scene is a point light source scene or not based on the recorded image statistical information; and executing a focusing process based on a regional luminance variance of image when the current scene is determined as a point light source scene, wherein the regional luminance variance of image denotes a mean of the square of differences between luminance values of a plurality of regions partitioned from an image and an average luminance value of the image.

According to one example, when determining whether the current scene is a point light source scene or not based on the recorded image statistical information, the machine-executable commands may cause the processor 610 to perform the following operations:

comparing a current image luminance value with a minimum image luminance value, wherein the current image luminance value denotes a luminance value of an image corresponding to the current position of the focusing lens, and the minimum image luminance value denotes the minimum among luminance values of images respectively corresponding to positions of the focusing lens from the beginning of focusing; and preliminarily determining that the current scene is a point light source scene, if an absolute value of a difference between the current image luminance value and the minimum image luminance value is larger than a first threshold.

According to one example, after preliminarily determining the current scene is a point light source scene, the machine-executable commands may further cause the processor 610 to perform the following operations:

partitioning an image corresponding to the current position of the focusing lens into N*M regions, wherein N and M are integers greater than or equal to 1 respectively; and determining whether the current scene is a point light source scene or not again based on luminance values of the N*M regions, According to one example, when determining whether the current scene is a point light source scene or not again based on the luminance values of the N*M regions, the machine-executable commands may cause the processor 610 to perform the following operations:

selecting a suspected point light regions from the N*M regions in a descending order of the luminance values, wherein n is an integer greater than or equal to 1;

acquiring k luminance ratios for each of the suspected point light source regions by calculating a ratio of a luminance value of each of the suspected point light source regions with respect to a luminance value of each of k regions adjacent to the suspected point light source region, wherein k is an integer greater than or equal to 4;

determining that the current scene is a point light source scene, if there is at least one suspected point light source region for which two or more among the k luminance ratios are greater than a second threshold.

According to another example, when determining whether the current scene is a point light source scene or not again based on the luminance values of the N*M regions, the machine-executable commands may cause the processor 610 to perform the following operations:

determining whether the N*M regions comprise a high luminance region and a low luminance region or not, wherein the high luminance region is a region whose luminance value is greater than a high luminance threshold, and the low luminance region is a region whose luminance value is smaller than a low luminance threshold; and determining that the current scene is a point light source scene, if the N*M regions comprise both the high luminance region and the low luminance region.

According to another example, when determining whether the current scene is a point light source scene or not again based on the luminance values of the N*M regions, the machine-executable commands may cause the processor 610 to perform the following operations:

classifying the N*M regions into a high luminance ratio region, a medium luminance ratio region and a low luminance ratio region, in accordance with a ratio of a luminance value of the brightest region within the N*M regions with respect to a luminance value of each of other regions within the N*M regions;

counting the number Nhigh of the high luminance ratio region, the number Nmedium of the medium luminance ratio region and the number Nlow of low luminance ratio region;

determining that the current scene is a point light source scene, if the number Nhigh is greater than 0 and the number Nlow is smaller than a third threshold Ca; or determining that the current scene is a point light source scene, if the number Nhigh is equal to 0 and the number Mow is greater than a fourth threshold Cb; or determining that the current scene is a point light source scene, if the number Nmedium is greater than a fifth threshold Cc and the number Nlow is smaller than the third threshold Ca.

According to one example, when executing the focusing process based on the regional luminance variance of image, the machine-executable commands may cause the processor 610 to perform the following operations:

recording image statistical information corresponding to each position of the focusing lens from the beginning of focusing, wherein the image statistical information may comprise a luminance value and the regional luminance variance of the image;

setting a search direction based on recorded regional luminance variances;

setting a focus point based on the recorded regional luminance variances when the current scene is determined as a point light source scene based on the image statistical information corresponding to the current position of the focusing lens and a search termination condition has been satisfied; and setting a new position of the focusing lens along the set search direction and repeating the above processing, when the current scene is determined as a point light source scene based on the image statistical information corresponding to the current position of the focusing lens but the search termination condition has not been satisfied yet.

According to one example, when setting the search direction based on the recorded regional luminance variances, the machine-executable commands may cause the processor 610 to perform the following operations:

determining the current changing trend of regional luminance variance based on the recorded regional luminance variances;

changing the search direction to a direction opposite to the current search direction, if the current changing trend of regional luminance variance is increasing and a difference of a regional luminance variance corresponding to the current position of the focusing lens with respect to a regional luminance variance corresponding to a previous position of the focusing lens exceeds a sixth threshold; and keeping the current search direction unchanged if the current changing trend of regional luminance variance is decreasing.

According to one example, when determining the current changing trend of regional luminance variance based on the recorded regional luminance variances, the machine-executable commands may cause the processor 610 to perform the following operations:

comparing the regional luminance variance corresponding to the current position of the focusing lens with the regional luminance variances corresponding to previous two positions of the focusing lens, if the regional luminance variances are decreased continuously, the current changing trend of regional luminance variance is decreasing, and if the regional luminance variances are increased continuously, the current changing trend of regional luminance variance is increasing.

According to one example, the search termination condition may comprise any one of the following the search direction has been-hanged and the current changing trend of regional luminance variance is significantly increasing; and the current changing trend of regional luminance variance is significantly increasing and the changing trend of regional luminance variance was significantly decreasing.

According to one example, when setting the focus point based on the recorded regional luminance variances, the machine-executable commands may cause the processor 610 to perform the following operations: setting a position of the focusing lens corresponding to the minimum of the recorded regional luminance variances to be a focus point of the focusing lens.

According to one example, the machine-executable commands may further cause the processor 610 to perform the following operations:

disabling exposure function before setting a first position of the focusing lens; and enabling the exposure function before setting the focus point based on the recorded regional luminance variances.

The foregoing descriptions are only preferred embodiments of the present disclosure, and any of modifications, equivalent replacements, improvements, and the like made within the spirit and principle of this disclosure shall be included in the protection scope of this disclosure.

The invention claimed is:

1. A focusing method, comprising:
 recording image statistical information corresponding to each position of a focusing lens from the beginning of focusing, wherein the image statistical information comprises a luminance value of an image;
 determining whether the current scene is a point light source scene or not based on the recorded image statistical information; and
 executing a focusing process based on a regional luminance variance of the image when the current scene is determined as a point light source scene, wherein:
 the executing the focusing process based on the regional luminance variance of the image comprises:
  recording image statistical information corresponding to each position of the focusing lens from the beginning of focusing, wherein the image statistical information comprises a luminance value and the regional luminance variance of the image;

setting a search direction based on the recorded regional luminance variances;

setting a position of the focusing lens corresponding to the minimum of the recorded regional luminance variances to be a focus point of the focusing lens, when the current scene is determined as a point light source scene based on the image statistical information corresponding to the current position of the focusing lens and a search termination condition has been satisfied; and setting a new position of the focusing lens along the set search direction and repeating the above process, when the current scene is determined as a point light source scene based on the image statistical information corresponding to the current position of the focusing lens but the search termination condition has not been satisfied yet, and the regional luminance variance of the image denotes a mean of the square of differences between luminance values of a plurality of regions partitioned from an image and an average luminance value of the image.

2. The focusing method according to claim 1, wherein determining whether the current scene is a point light source scene or not based on the recorded image statistical information comprises:

comparing a current image luminance value with a minimum image luminance value, wherein the current image luminance value denotes a luminance value of an image corresponding to the current position of the focusing lens, and the minimum image luminance value denotes the minimum among luminance values of images respectively corresponding to positions of the focusing lens from the beginning of focusing; and preliminarily determining that the current scene is a point light source scene, if an absolute value of a difference between the current image luminance value and the minimum image luminance value is larger than a first threshold.

3. The focusing method according to claim 2, wherein after preliminarily determining that the current scene is a point light source scene, the focusing method further comprises:

partitioning an image corresponding to the current position of the focusing lens into N*M regions, wherein N and M are integers greater than or equal to 1 respectively; and determining whether the current scene is a point light source scene or not again based on luminance values of the N*M regions.

4. The focusing method according to claim 3, wherein determining whether the current scene is a point light source scene or not again based on the luminance values of the N*M regions comprises:

selecting n suspected point light regions from the N*M regions in a descending order of the luminance values, wherein n is an integer greater than or equal to 1;

acquiring k luminance ratios for each of the suspected point light source regions by calculating a ratio of a luminance value of each of the suspected point light source regions with respect to a luminance value of each of k regions adjacent to the suspected point light source region, wherein k is an integer greater than or equal to 4;

determining that the current scene is a point light source scene, if there is at least one suspected point light source region for which two or more among the k luminance ratios are greater than a second threshold.

5. The focusing method according to claim 3, wherein determining whether the current scene is a point light source scene or not again based on the luminance values of the N*M regions comprises:

determining whether the N*M regions comprise a high luminance region and a low luminance region, wherein the high luminance region is a region whose luminance value is greater than a high luminance threshold, and the low luminance region is a region whose luminance value is smaller than a low luminance threshold; and determining that the current scene is a point light source scene, if the N*M regions comprise both the high luminance region and the low luminance region.

6. The focusing method according to claim 3, wherein determining whether the current scene is a point light source scene or not again based on the luminance values of the N*M regions comprises:

classifying the N*M regions into a high luminance ratio region, a medium luminance ratio region and a low luminance ratio region, in accordance with a ratio of a luminance value of the brightest region within the N*M regions with respect to a luminance value of each of other regions within the N*M regions;

counting the number Nhigh of the high luminance ratio region, the number Nmedium of the medium luminance ratio region and the number Nlow of the low luminance ratio region;

determining that the current scene is a point light source scene, if the number Nhigh is greater than 0 and the number Nlow is smaller than a third threshold Ca; or determining that the current scene is a point light source scene, if the number Nhigh is equal to 0 and the number Nlow is greater than a fourth threshold Cb; or determining that the current scene is a point light source scene, if the number Nmedium is greater than a fifth threshold Cc and the number Nlow is smaller than the third threshold Ca.

7. The focusing method according to claim 1, wherein setting the search direction based on the recorded regional luminance variances comprises:

determining the current changing trend of regional luminance variance based on the recorded regional luminance variances;

changing the search direction to a direction opposite to the current search direction, if the current changing trend of regional luminance variance is increasing and a difference of a regional luminance variance corresponding to the current position of the focusing lens with respect to a regional luminance variance corresponding to a previous position of the focusing lens exceeds a sixth threshold; and keeping the current search direction unchanged if the current changing trend of regional luminance variance is decreasing.

8. The focusing method according to claim 7, wherein the search termination condition comprises any one of the following:

the search direction has been changed and the current changing trend of regional luminance variance is significantly increasing; and the current changing trend of regional luminance variance is significantly increasing and the changing trend of regional luminance variance was significantly decreasing.

9. The method according to claim 1, further comprising:
disabling exposure function before setting a first position of the focusing lens; and
enabling the exposure function before setting the focus point based on the recorded regional luminance variances.

10. A focusing device comprising a processor, wherein the processor, by reading machine-executable commands which correspond to focusing control logic and are stored in a machine readable storage medium and executing the machine-executable commands, performs the following operations:
recording image statistical information corresponding to each position of a focusing lens from the beginning of focusing, wherein the image statistical information comprises a luminance value of an image;
determining whether the current scene is a point light source scene or not based on the recorded image statistical information; and
executing a focusing process based on a regional luminance variance of the image when the current scene is determined as a point light source scene, wherein:
the executing the focusing process based on the regional luminance variance of the image comprises:
recording image statistical information corresponding to each position of the focusing lens from the beginning of focusing, wherein the image statistical information comprises a luminance value and the regional luminance variance of the image;
setting a search direction based on the recorded regional luminance variances;
setting a position of the focusing lens corresponding to the minimum of the recorded regional luminance variances to be a focus point of the focusing lens, when the current scene is determined as a point light source scene based on the image statistical information corresponding to the current position of the focusing lens and a search termination condition has been satisfied; and
setting a new position of the focusing lens along the set search direction and repeating the above process, when the current scene is determined as a point light source scene based on the image statistical information corresponding to the current position of the focusing lens but the search termination condition has not been satisfied yet, and
the regional luminance variance of the image denotes a mean of the square of differences between luminance values of a plurality of regions partitioned from an image and an average luminance value of the image.

11. The focusing device according to claim 10, wherein when determining whether the current scene is a point light source scene or not based on the recorded image statistical information, the machine-executable commands cause the processor to perform the following operations:
comparing the current image luminance value with a minimum image luminance value, wherein the current image luminance value denotes a luminance value of an image corresponding to the current position of the focusing lens, and the minimum image luminance value denotes the minimum among luminance values of images respectively corresponding to positions of the focusing lens from the beginning of focusing; and
preliminarily determining that the current scene is a point light source scene, if an absolute value of a difference between the current image luminance value and the minimum image luminance value is larger than a first threshold.

12. The focusing device according to claim 11, wherein after preliminarily determining that the current scene is a point light source scene, the machine-executable commands further cause the processor to perform the following operations:
partitioning an image corresponding to the current position of the focusing lens into N*M regions, wherein N and M are integers greater than or equal to 1 respectively; and
determining whether the current scene is a point light source scene again based on luminance values of the N*M regions.

13. The focusing device according to claim 10,
wherein the search termination condition comprises any one of the following: the search direction has been changed and the current changing trend of regional luminance variance is significantly increasing; and the current changing trend of regional luminance variance is significantly increasing and the changing trend of regional luminance variance was significantly decreasing.

14. The focusing device according to claim 13, wherein when setting the search direction based on the recorded regional luminance variances, the machine-executable commands cause the processor to perform the following operations:
determining the current changing trend of regional luminance variance based on the recorded regional luminance variances;
changing the search direction to a direction opposite to the current search direction, if the current changing trend of regional luminance variance is increasing and a difference of a regional luminance variance corresponding to the current position of the focusing lens with respect to a regional luminance variance corresponding to a previous position of the focusing lens exceeds a sixth threshold; and
keeping the current search direction unchanged if the current changing trend of regional luminance variance is decreasing.

* * * * *